Oct. 29, 1935.  E. H. UNKLES  2,018,691
PROJECTION APPARATUS
Original Filed Dec. 12, 1928  5 Sheets-Sheet 4
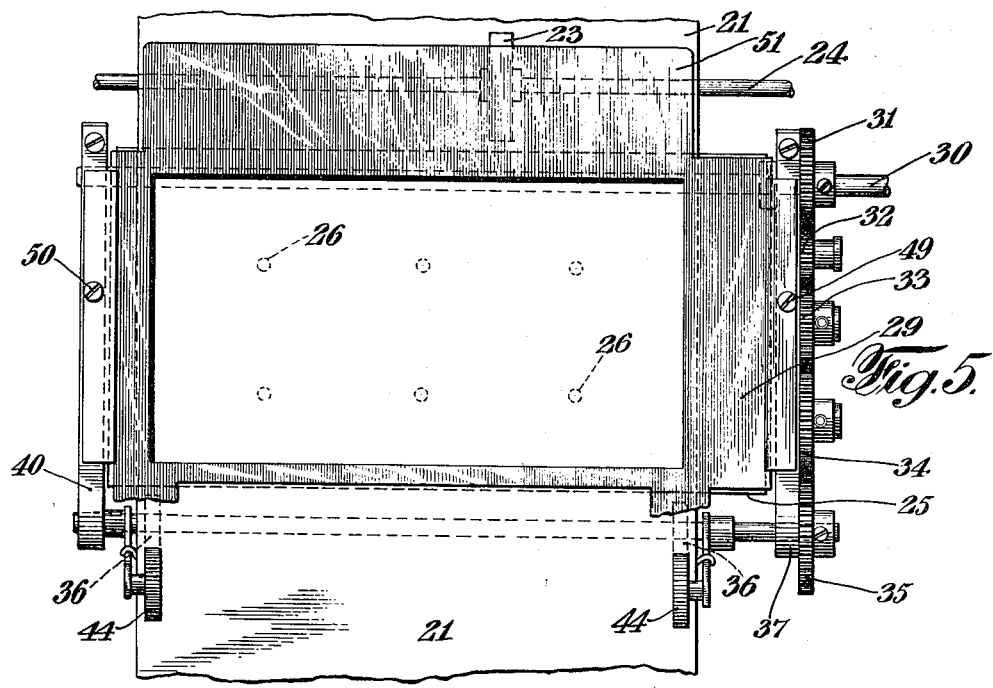
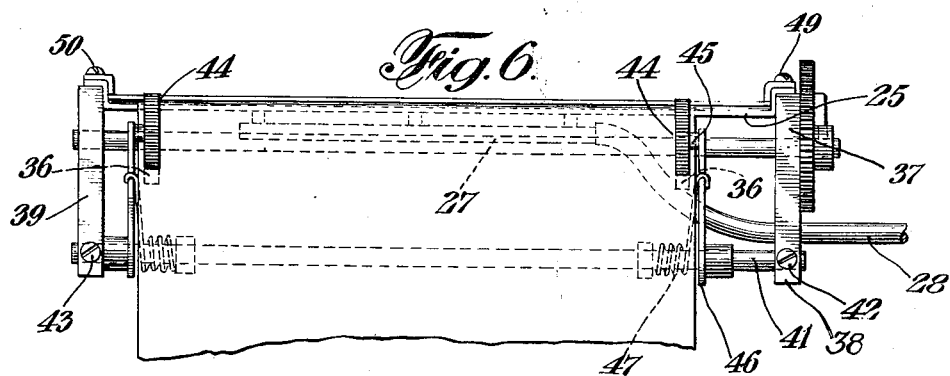
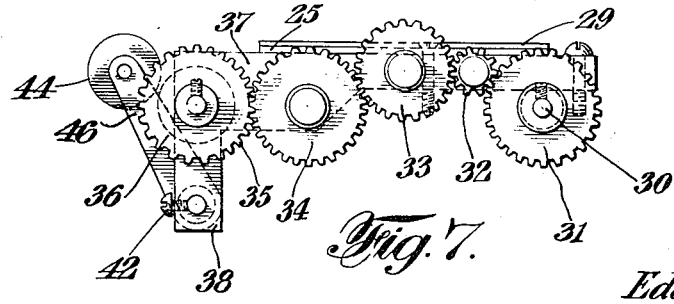
INVENTOR
Edward H. Unkles
BY
Ward & Crosby
ATTORNEYS Oct. 29, 1935.　　　E. H. UNKLES　　　2,018,691
PROJECTION APPARATUS
Original Filed Dec. 12, 1928　　5 Sheets-Sheet 5
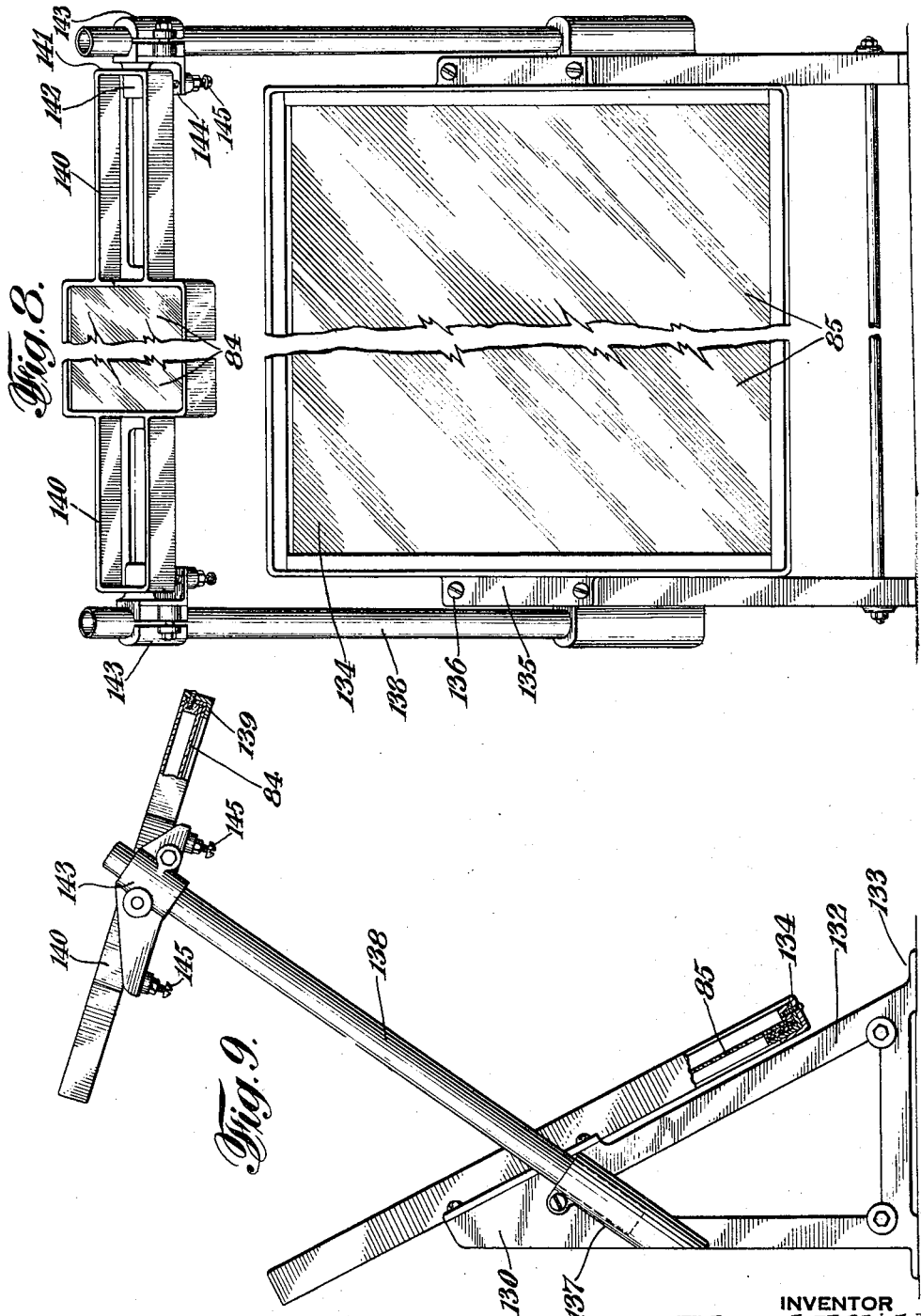
INVENTOR
Edward H. Unkles
BY Ward & Crosby
ATTORNEYS Patented Oct. 29, 1935

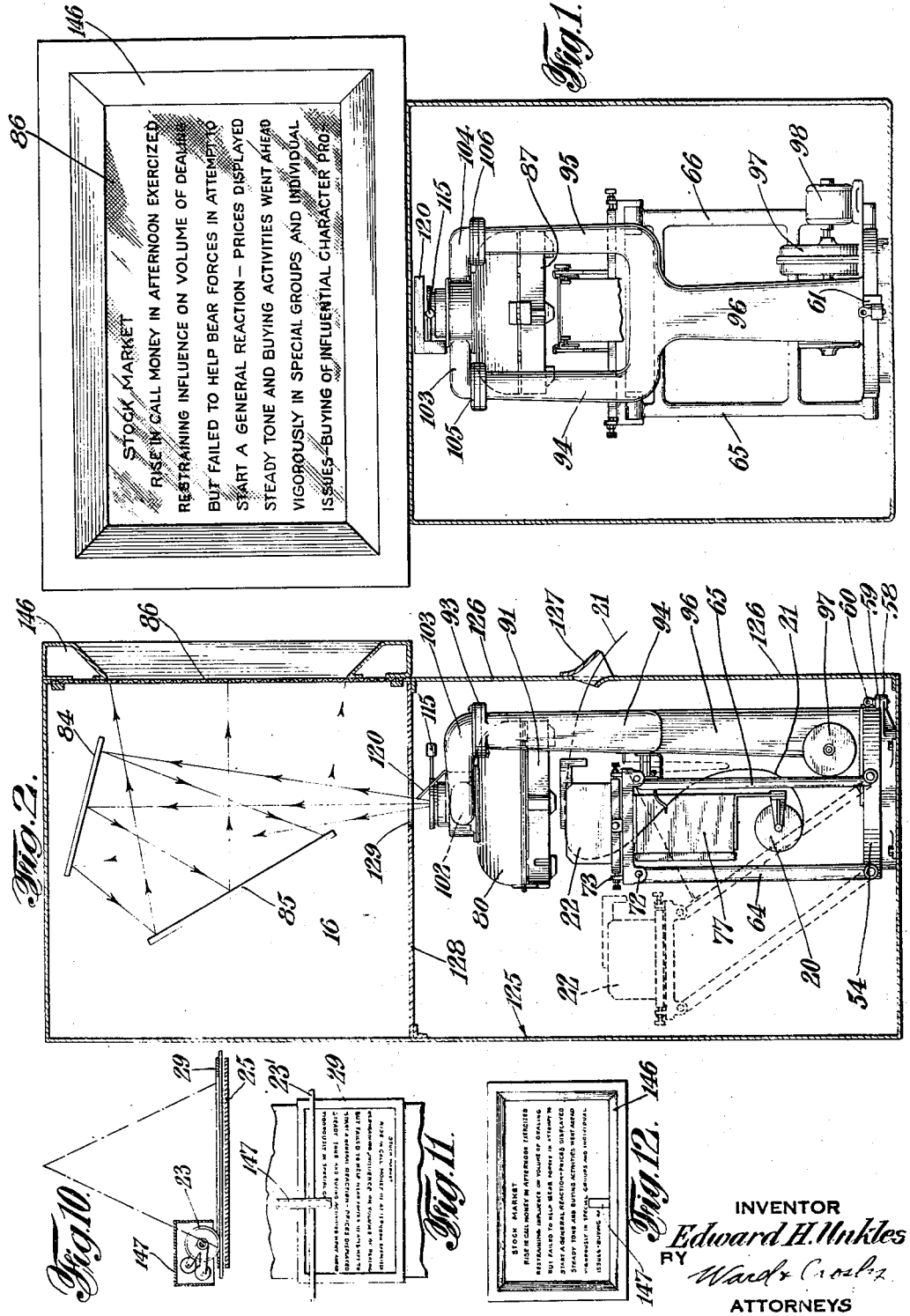

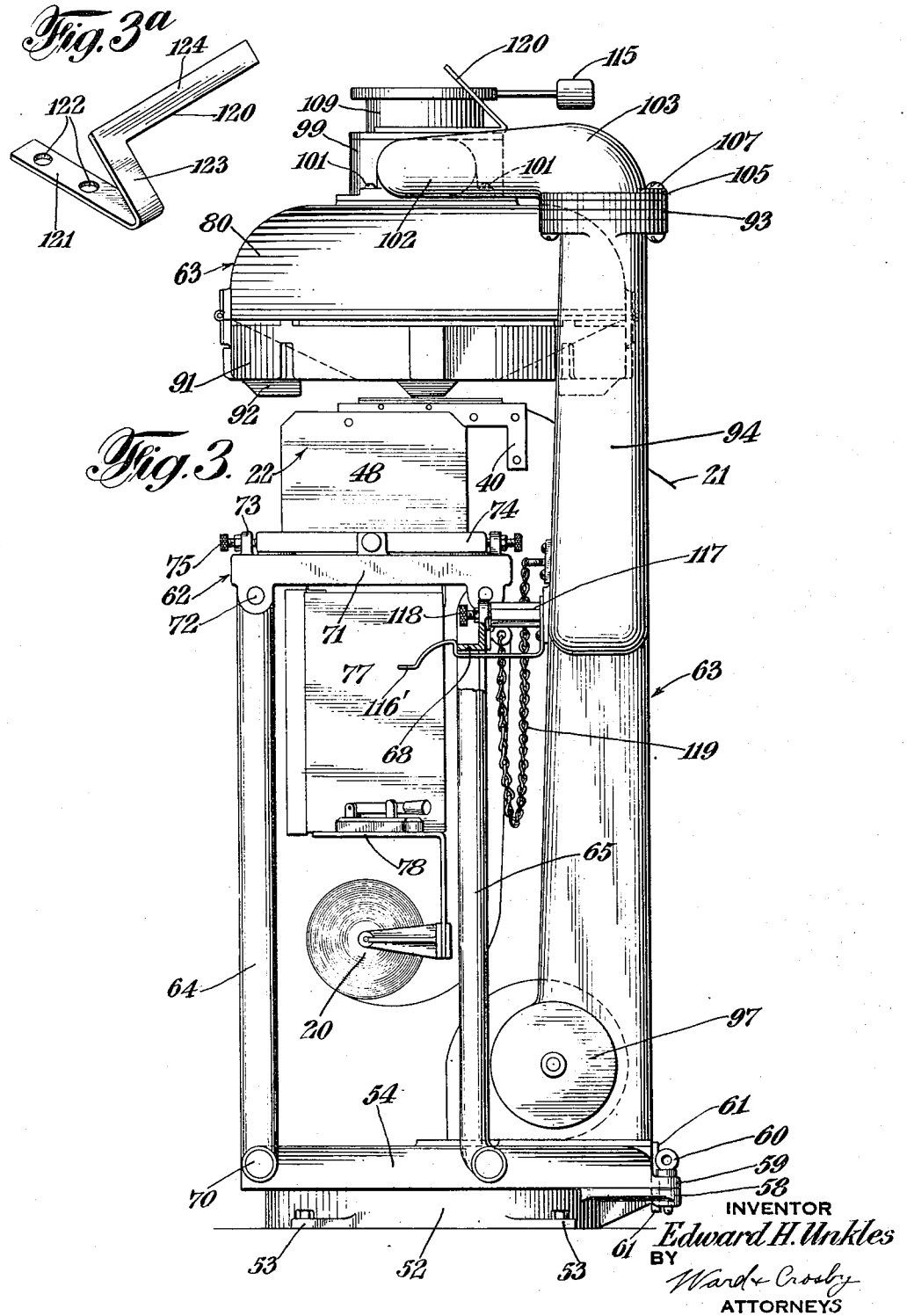

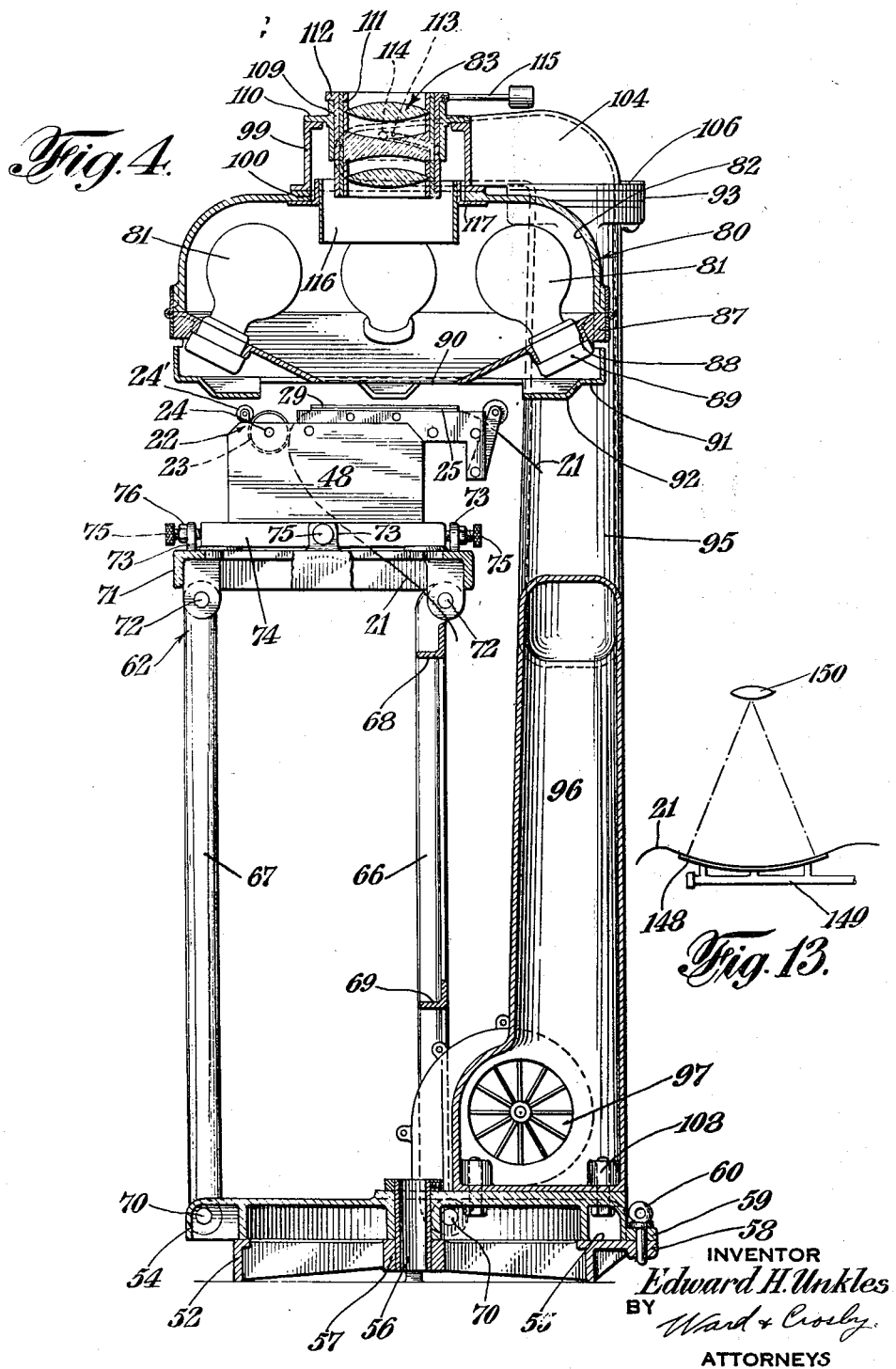

2,018,691

UNITED STATES PATENT OFFICE 2,018,691

PROJECTION APPARATUS

Edward H. Unkles, Weehawken, N. J., assignor to Trans-Lux Daylight Picture Screen Corporation, New York, N. Y., a corporation of Delaware Application December 12, 1928, Serial No. 325,551
Renewed April 27, 1934

9 Claims. (Cl. 88—24)

This invention relates to a projecting apparatus, and more particularly to an apparatus for projecting on a screen subject matter such as news items which are printed successively on a traveling web.

The present invention according to one of its phases has for an object, the provision of means to make it possible for a large number of spectators to observe and read the items that are printed by a machine of the type which utilizes a wide web of paper and which prints the items on the web in lines which extend transversely to the length of said web and transversely to the direction of its travel.

Various further specific objects, features and advantages will more clearly appear from the detailed description given below taken in connection with the accompanying drawings which form a part of this specification.

In the drawings, Fig. 1 is a front elevational view of an apparatus, as arranged in a cabinet, shown partly in section, and representing one embodiment of the present invention;

Fig. 2 is a view taken at right angles to Fig. 1, of the same apparatus;

Fig. 3 is an enlarged side elevational view of the apparatus without the cabinet and screen;

Fig. 3a is an enlarged detail view of a part of the apparatus;

Fig. 4 is a vertical sectional view of the apparatus shown in Fig. 3;

Fig. 5 is a plan view of the web holding and web feeding devices;

Fig. 6 is a front elevational view of said devices;

Fig. 7 is a side view of said devices;

Fig. 8 is an enlarged view of certain reflecting devices embodied in the apparatus;

Fig. 9 is a side view of the devices shown in Fig. 8;

Figs. 10, 11 and 12 show details of a modified form of construction; and

Fig. 13 is a diagram illustrating certain details of another modified arrangement.

Referring to the drawings, a reel 20 is shown which carries a web of paper 21 which passes through a printing mechanism 22 where news items are printed thereon in the form of successive lines disposed transversely of the length of the web and of its direction of travel. The printing mechanism may be of any desirable type well known in the art. For the purposes of the present invention, it is only necessary to indicate a type wheel 23, which in the course of the operation of the printing device travels longitudinally of a shaft 24 so as to print a line across the web 21.

The type wheel 23 may obtain its ink from an inking roll 24'. It will be observed that the type wheel operates in a lateral direction against the web 21 when the same is in a substantially vertical position. Immediately after the web leaves the type wheel, it is extended into a horizontal position and is caused to pass over a supporting and suction plate 25 which is provided with a plurality of apertures 26. A suction nozzle 27 may be mounted at the lower face of the plate 25, and operatively connected to any desired form of suction device by means of a hose 28.

A frame 29 may be disposed over the suction plate 25 and the web 21 travels and is guided between the frame 29 and the suction plate. The object of the suction plate of the suction device is to draw the paper down flat against the plate, so that the paper may be maintained flat, thus eliminating any bulging thereof which tends to cause distorted projection. The frame 29 serves to outline that printed portion of the web which it is desired to project.

While a line is being printed on the web, the paper remains stationary. At the completion of each line, however, the web is moved longitudinally a distance equal to the space between the printed lines. The driving means which commonly appear in printing devices of this type are utilized to feed the paper in the present construction. In such devices, however, the feeding is accomplished at a point immediately beyond the type wheel. In the present construction this feeding operation is preferably transferred to a point removed from the type wheel so that the suction table and the frame 29 may be disposed between the type wheel and the point at which the feeding of the paper is accomplished.

A shaft 30 may be driven by the printing mechanism and is arranged to operate feeding rollers in a properly timed relationship with the type wheel, so that the web is fed a predetermined amount at the completion of the printing of each line. Power from the shaft 30 is transmitted by means of suitable gears as at 31, 32, 33, 34 and 35 to feed rollers 36. The gear 31 is carried by the shaft 30 and is driven thereby, while the gears 32, 33 and 34 are carried by stud shafts which are mounted on a supporting member 37. The supporting member 37 may be provided with a depending portion 38, which cooperates with a corresponding depending portion 39 of an oppositely disposed end supporting member 40. The members 38 and 39 support a rod 41 which may be held against rotation by means of set screws as at 42 and 43.

A pair of rollers 44 rotatably mounted on stud shafts as at 45, which in turn are carried by arms as at 46 mounted on the rod 41 and spring pressed by helical springs 47, press against the web 21 and hold the same in engagement with the feed rollers 36 so as to facilitate the intermittent feeding of the web, the web being disposed between the feed rollers 36 and the respective press rollers 44.

The side supporting members 37 and 40 are mounted on end plates 48 of the printing mechanism and also serve to support the suction plate 25 and the frame 29, which may be attached to the side supporting members by means of the screws 49 and 50.

The frame 29 is provided with a lateral extension 51 which serves to hide the type wheel 23 from view and also protects the type wheel and the ink thereon from the source of light and heat disposed over the printing mechanism.

Having described the cooperation of the web feeding means with the printing mechanism, I shall now proceed with a description of the manner in which the printing and feeding devices are mounted. The mounting means according to the present invention is preferably so designed that the portion of the printed web that is exposed within the frame 29 may be readily moved within certain limits from one position to another whereby the image projected therefrom may be properly located on the screen; the supporting means for the printer being also preferably so constructed that access may be had to the printing mechanism or to any part thereof without disturbing the projecting devices.

In Figs. 3 and 4, 52 represents a casting which may be provided with apertured lugs 53 so that it may be bolted either to the floor or to the floor of a housing cabinet. The casting 52 has a bearing surface 55 which serves to rotatably support a casting 54. The casting 54 may be provided with a stub shaft 56 which rotates within a bearing 57 provided in the base 52.

As will appear from a further description of the construction and operation of the apparatus, the casting 54 serves as a support for many of the operating elements of the apparatus and this support is made rotatable with respect to the base 52 for the purpose of facilitating access to the printing mechanism. Under normal operation of the apparatus, however, it is desired that the support 54 remain affixed with relation to the base 52. For this purpose therefore the base 52 and the support 54 are provided with cooperating apertured lugs 58 and 59, which are so disposed that when the apparatus is in its normal position, the apertures of said lugs are in register with each other, and a removable bolt 60 is inserted into said lugs to hold the base 52 and the support 54 against inadvertent relative movement. When it is desired to gain access to the printing mechanism, the bolt 60 is removed and the apparatus including the support 54 is rotated about the shaft 56 into position such that access may be had to the printing mechanism.

In order to facilitate the registry of the apertures and the lugs 58 and 59, the support 54 may be provided with a lateral and vertical extension 61, as shown in Fig. 3, which abuts the lug 58 when the support 54 and the apparatus mounted thereon are rotated, and thereby also prevents the apparatus from being rotated in the wrong direction.

A table 62, which serves to support the web and the printing mechanism, is preferably separate from the projecting devices 63, altho both units are mounted in spaced positions on the support 54.

The table 62 which serves to support the printing mechanism is preferably so mounted on the base 54 that it may be moved into the dotted position indicated in Fig. 2. The table 62 is provided with four legs 64, 65, 66 and 67. The pair of legs 65 and 66, which may be in the form of angle irons, are reinforced by horizontal angle irons 68 and 69. The pair of legs 64 and 67 may be similarly reinforced. Each of these pairs of legs, together with the reinforcing elements, therefore may constitute assembly units. Each of the legs may be pivotally mounted on the support 54 as indicated at 70, so that these legs, together with a table top 71 and the printing mechanism may be moved from the full line position as shown in Fig. 2 to the dotted line position shown therein.

The table top 71, which is in the form of a rectangular frame provided with a rectangular depending flange, carries stud shafts 72 which serve as a means for pivotal mounting of the table top on the legs 64, 65, 66 and 67. When the table top 71 and its supporting legs are moved from the full line position to the dotted line position shown in Fig. 2, the table will still remain in a horizontal position. Each of the four sides of the table top 71 carries a lug, as at 73, approximately centrally thereof, the lug being provided with a threaded aperture. A rectangular frame 74 is placed on top of the table top 71, and is provided with means for firmly affixing thereto the base plate of the printing mechanism. The frame 74, together with the printing mechanism, is therefore disposed on the table top and within the space enclosed by the upwardly projecting lugs 73 in such a manner that the frame 74 and the printing mechanism may be moved a substantial amount as desired, in order that the printed items may be properly aligned with the projecting apparatus. Threaded bolts 75 which cooperate with the threaded apertures of the lugs 73 serve to properly position the frame 74 and to receive the same in position. Lock nuts 76 are carried by the bolts 75 in order to retain the bolts in the desired position.

It will be understood that the projector if desired may be made adjustable in respect to the printing mechanism, in order to provide the desired relative adjustability between the printing device and projector, thereby making it possible to project an integral number of lines of printed matter on the screen, such lines being properly spaced within the screen frame and with no fractional parts of lines exhibited.

A junction box is indicated at 77 which carries the fuses and wiring connections for the printing mechanism, the box being mounted on the under side of the table top 71, and a bracket 78 mounted on the under side of the box 77 serves to support the reel 20.

The projecting mechanism, which cooperates with the printing device so as to project an enlarged image of a predetermined number of printed lines on to a screen where it may be observed and read by a large number of spectators, comprises the illuminating unit 80 which may embody a plurality of lamps 81 and a reflecting surface 82, a projector lens 83, reflectors 84 and 85, a screen 86 and various cooling conduits. The cooling conduits with the light and lens units, all together constitute one assembly unit which is mounted on the support 54.

The housing of the illuminating unit 80 is dome-shaped, having a large opening at its top to permit of the proper mounting of the lens system 83. The housing 80 is preferably provided with a diffusive reflecting surface 82. A hopper-like light supporting structure 87 is attached to the under face of the housing 80, and is provided with a circular series of openings 88 for receiving lamp sockets 89. The lamps 81 are, therefore, disposed in a circle around an opening 90 of the light housing, with the result that substantially a maximum amount of light is transmitted by the lamps 81 from the housing through the opening 90.

In order to protect the lamp sockets and the wiring against possible injury, a cup-shaped annular ring 91 is attached to the supporting member 87, this ring 91 serving to cover the protruding portions of the sockets and of the wiring leading thereto. The ring 91 is preferably provided with depressed portions 92 at such points where it is disposed immediately below the sockets, so as to provide ample room for the installation of the sockets.

The housing 80 is associated with horizontally projecting tubular members 93, which are provided with large openings and which are adapted to register with two vertical conduits 94 and 95, these conduits merging into one larger conduit 96 in the lower portion of the air cooling system. The conduit 96 is enlarged in its lower portion and carries a fan 97 which is operated by an electric motor 98.

A cap member 99 is disposed immediately over an opening 100 in the dome-like housing 80 and is attached thereto by means of screws or screw bolts 101. The cap member 99 is also provided with a pair of lateral openings 102 communicating respectively with a pair of conduits 103 and 104 serving to connect the cap 99 with the conduits 94 and 95, respectively. The elbow-shaped conduits 103 and 104 terminate in flanges 105 and 106, respectively, which are placed immediately over the tubular member 93 in such a manner that the passages in conduits 94 and 95 are continuous with the passages in the elbows 103 and 104, respectively, bolts 107 serving to hold the conduits, lamp housing and lens housing together, as one assembly unit which is secured on the support 54 by means of bolts 108.

A cylindrical sleeve 109 is supported on the upper end of the lens housing 99 by means of a tubular member having a lateral flange 110 (see Fig. 4), which is disposed intermediate the ends of the sleeve 109. The sleeve 109 is fixed in the position shown and serves to slidably support the lens system 83, which is mounted as a unit in a sleeve 111. The sleeve 109 is provided at its upper end with a lateral flange 112, which rests upon the upper edge of the member 110.

In order to permit the axial movement of the lens system 83, the lens carrier sleeve 109 is provided with an inclined groove 113, which cooperates with a pin 114 projecting into said groove from the member 109. When a handle 115 is moved so as to rotate the sleeves 109 and 111, the cooperation of the groove 113 and the pin 114 will bring about an axial movement of the lens system 83.

In order to prevent access of any light directly from the lamps 81 to the lens system 83, a downwardly projecting cylindrical shield 116 is mounted beneath the opening 100 in the housing 80 and secured by means of a lateral flange 117, which is disposed intermediate the ends of the cylindrical shield 116.

It will be seen that the fan 97 has direct communication with the inside of the lamp housing 80 and with the space between the printing device and the lamp housing through the conduits 96, 94 and 95 and elbow conduits 103 and 104, which lead into the cap 99, and thence through the cylindrical shield 116 into the lamp housing, and then into the space between the lamp housing and the printing mechanism through the opening 90. Cooling may be effected either by suction or blowing, as desired. It is understood that the entire lamp housing and air conduit system and lens system are so disposed with relation to the printing mechanism and the supporting means therefor, that the lens system is positioned immediately above the rectangular frame 29, so that all or any desired portion of the printed matter included in said frame may be projected on to a screen 86.

In order to permit of the proper positioning of the projected printed matter on the screen 86, the entire printing device may be adjusted by means of the screws 75. In order to prevent the printing mechanism and the supporting table therefor from falling back into its exposed position, viz., the dotted line position shown in Fig. 2, the conduit casting 96 carries a resilient catch 116′, which is so disposed that when the table and printing mechanism are in operative position, it engages the inside face of the angle iron 68, as shown in Fig. 3 of the drawings. A spacing block 117 is also mounted on the conduit 96 which cooperates with a screw 118 mounted in a threaded aperture in the vertical portion of the angle iron 68, so as to obtain a further adjustment of the vertical position of the table 30 and the printing mechanism. A chain 119 is attached at one end to the conduit casting and at the other end to the angle iron 68, so as to limit the extent of movement of the table and printing mechanism when the same is moved from its upright to its inclined position, shown in Fig. 2.

For the purpose of preventing the possibility of projecting on to the screen certain stray light which under certain circumstances might form "ghost" images on the screen, an adjustable member 120 is mounted at a point immediately adjacent the upper end of the lens system. The construction of this element 120 is shown in Fig. 3a, and comprises a foot portion 121, which is attached to the flange 110 by means of screws passing through apertures 122, an angularly inclined portion 123, and a horizontally extending arm 124 which is disposed in such a manner adjacent one side of the lens system and thereover, that by flexing the same, the undesired stray light may be cut off.

The assemblies thus far described, namely, the base 52, the support 54, and the devices mounted on said support, including the printing mechanism and the table therefor and the air conduit system together with the light and lens housings, may all be enclosed in a cabinet 125 and are preferably bolted to the floor of the cabinet. The cabinet is provided with a door 126, which is provided with a downwardly directed passage 127, through which the printed web 21 may pass, so that it may be cut up in strips and mounted at any desired point.

When, for any reason, it becomes desirable to gain access to the printing mechanism, the door 126 is opened, the bolt 60 is then removed, and the entire apparatus is rotated about the shaft 56, the latch 116′ is disengaged from the angle iron 68, and the printing mechanism, together with its supporting table is moved into the dotted line position shown in Fig. 2, so that the printing mechanism becomes easily accessible at the door of the cabinet.

A partition 128 of the cabinet is provided with an opening 129, which registers with the lens system, so that the projected light passes into an upper chamber 16, where it is reflected by the reflecting surfaces 84 and 85 on to the screen 86, the image formed on the screen being magnified so that the printed matter appearing thereon may be read at a distance.

The reflecting surfaces 84 and 85 are mounted in the chamber 16 in the manner shown in Figs. 8 and 9 of the drawings, and are preferably so disposed as to provide for the double reflection of the rays of light passing through the lens system into said chamber and on to the screen 86. While in the construction shown in the drawings the reflecting surface 85 is shown in a fixed position with relation to the opening 129 and the screen 86 and the reflecting surface 84 is made adjustable so as to obtain the image at the desired height on the screen; it is to be understood, however, that this relationship may be reversed if desired so that the reflecting surface 84 may be fixed and 85 may be adjustable, or if desired, both said surfaces may be adjustable.

The supporting means for the reflectors comprises a stand 130 having an inclined frame 134 provided with a pair of angular supporting legs 132 which in turn have feet 133 adapted to be bolted to the partition 128. The reflecting mirror 85 is enclosed in a frame 134 which is provided with lateral flanges 135 for bolting the same on to the support 130 by means of screws 136.

The support 130 carries on each side thereof a split clamping sleeve 137 for the support of a pair of extension rods 138. The sleeves 137 and the rods 138 are disposed angularly in such a manner that the reflecting surface 84 may be mounted upon the upper ends of the rods 138 to substantially overlie the opening 129, at the proper angle.

The frame 139 which holds the reflecting surface 84 is provided with lateral rectangular hollow extensions 140. The closed ends 141 of said extensions are provided with bearing apertures which cooperate with pivoting studs 142 on split clamps 143, which in turn are slidably mounted on the upper ends of the rods 138.

The rods 138 are preferably maintained in a fixed position by means of the clamping sleeves 137. By movement of the clamping sleeves 143 on the rods 138 the position of the reflecting surface 84 with relation to the lens system 83 and with relation to the reflector surface 85 may be adjusted at will in such a manner as to obtain the desired degree of magnification of the printed matter on the screen.

With the provision of such relative adjustability of the mirrors, the image may be properly located not only for a vertical screen but, if desired, also for a screen tilted forward, for example.

If desired the screen might be made adjustable in position and as to dimensions, in lieu of mirror adjustments. In some cases, and particularly where the printed strip of data to be projected is relatively elongated, the projection lens system may be more readily made to eliminate optical imperfections if the projection table is formed with a curvature as at 148 (see Fig. 13), in which case suction connections as at 149 may be provided to retain the paper strip in contact with the table. With such arrangements all transverse sections of the projected area of the strip may be located at substantially the same distance from the object glass as at 150 of the projection lens system.

It is preferable that the reflecting surfaces 84 and 85 be so disposed with relation to each other and with relation to the screen that the path of travel of a series of rays of light equidistant from the optical axis of the lens system should be substantially equal in length. For this reason and in order to permit adjustment of the image at the proper elevation, a support for the reflecting surface 84 is preferably provided with an adjustment for varying the angular position of the reflecting surface 84. Each clamping sleeve 143 is provided with an inwardly projecting ledge 144 which is disposed immediately below the closed ends 141 of the extensions 140. Ledges 144 are provided with threaded apertures receiving adjustment screws 145 which project above the ledges and abut against the lower edges of the extensions 140. By proper manipulation of screws 145, the reflector 84 may be tilted and the same may be positioned in the proper angular relationship to the reflecting surface 85 so as to obtain a non-distorted image at the desired height on the screen.

The screen 86 which is preferably mounted on the front face of the reflecting chamber 16 is provided with a rectangular hollow frame 146 which presents a series of inclined faces around the screen. The frame 146 serves to protect the screen and to prevent any excessive amount of light from striking the front face of the screen.

In one of the preferred embodiments of the invention, the various elements entering into the construction are so designed as to provide for the projection of a plurality or series of printed lines, each line being entirely completed. In the modification shown in Figs. 10, 11 and 12, a structure is provided which makes it possible to project a series of printed lines which includes the last line in the process of being printed.

For this purpose the structure is modified in such a manner that the printing instead of taking place laterally at a point on the traveling web where it is in a vertical position, the printing takes place vertically and after the web has assumed a horizontal position in the frame 29, the opening in the frame being enlarged to include the type wheel 23 and the relationship between the frame and the optical system being such that the line which is being printed is projected in so far as possible, together with a series of completely printed lines. In order to protect the type wheel and the inking rollers against the effect of the heat from the lamp 81, a narrow casing 147 is mounted on the shaft 24 in such a manner that it moves longitudinally of the shaft together with the type wheel 23. Fig. 10 shows a vertical sectional view of the arrangement described, and Fig. 11 shows a plan view of such an arrangement in which a shaft 23' is disposed over the frame 29. Fig. 12 shows the image obtained on the screen of the apparatus shown in Figs. 10 and 11.

In order that the intense heat from the source of illumination will not create dangerous temperature conditions, the lamp circuit should preferably be under the control of the ventilating motor, that is, the lamp circuit may be arranged to be under the control of any known form of centrifugal switch operatively connected to the motor, whereby if the motor stops or slows down beyond a predetermined limit, the lamp circuit will be broken. With such arrangement, the lamps will be lighted only when sufficient circulation of cooling air is available to prevent overheating of the paper or the web and mechanism in the neighborhood of the lamp.

While the invention as illustrated in connection with the particular example above described provides for projection of the printed data by reflection from the web, it will be understood that according to certain phases of the invention the light might be projected through a translucent or a transparent web. The data may be printed either by the use of a dark colored or black ink on a web providing a light background, or in some instances it may be found desirable to use a web furnishing a black or dark background upon which the characters may be printed with white or light colored ink. This last alternative is particularly advantageous in securing a sharp definition of the printed image on the screen, particularly when the screen is located in a relatively well lighted room and where the image is projected on to the rear of the screen.

To suit various operating conditions, the relative arrangements and spacings of the portions of the apparatus may of course be altered. For example, the printed strip might be retained in a vertical position while the data is being projected therefrom, and the position of the other parts of the apparatus would be correspondingly altered.

While the printing device herein is of the type which is operated electrically from a central station and is designed to transmit news to a large number of stations from a central transmitting station, it is of course apparent that this invention in certain of its aspects may be used in connection with other types of printing devices.

In the appended claims, it shall be understood that the expression "printing device" generically comprehends any equivalent arrangement such, for example, as a typewriter, telautograph, etc. for producing or forming characters in line form transversely of a travelling web.

While I have described my improvements in detail and with respect to preferred forms thereof, I do not desire to be limited to such details or forms, since many changes and modifications may be made without departing from the spirit and scope of the invention in its broader aspects. Hence I desire to cover all modifications and forms coming within the language or scope of any one or more of the appended claims.

What is claimed as new and desired to secure by Letters Patent is:

1. In combination, a printing device adapted to print data successively in line form transversely of a traveling web, a table for supporting a printed portion of said web, a dome shaped housing disposed over said table and having an opening in registry with said table, a projector lens carried by said housing, a source of light disposed within said housing for illuminating the printed matter on the table, and means shading the projector lens from the source of light.

2. An optical projector for a traveling sheet of printed matter, said projector comprising a housing, a circumferential series of lights within said housing, a projector lens and chamber therefor carried by said housing, and a conduit connected to said chamber for passing cooling air through said chamber and housing.

3. The combination with a cabinet having a removable door at the front thereof, of a printing device adapted to print data successively in line form transversely of a traveling web, a projector for projecting images of a portion of the printed matter, a support for said printing device, means for rotatably mounting said support whereby said printing device may be positioned adjacent the open side of said cabinet when said door is removed therefrom, and means for pivotally mounting said printing device whereby it may be positioned exteriorly of said cabinet.

4. The combination with a cabinet having an opening, of a printing device adapted to print data in line form transversely of a web, a projector for projecting images of the printed matter, a support for said printing device, means for rotatably mounting said support whereby said printing device may be positioned adjacent the cabinet opening, and means for pivotally mounting said printing device whereby it may be moved toward said opening.

5. The combination with a cabinet having an opening, of a printing device adapted to print data in line form transversely of a web, a projector for projecting images of the printed matter, a support for said printing device and said projector, means for rotatably mounting said support whereby said printing device may be positioned adjacent the cabinet opening, and means for pivotally mounting said printing device whereby it may be moved toward said opening.

6. The combination with a fixed screen, of a projector including a projection lens and a projection field, a printing device adapted to print data in line form transversely of a web movable across said projection field, a support for said projection lens, projection field and printing device, means for rotatably mounting said support, and means for retaining said support in a predetermined position whereby the images produced by said projection lens are positioned properly on said screen.

7. The combination with a fixed screen, of a projector including a projection lens and a projection field, a printing device adapted to print data in line form transversely of a web movable across said projection field, a support for said projection lens, projection field and printing device, means for pivotally mounting said printing device on said support, means for rotatably mounting said support, and means for retaining said support in a predetermined position whereby the images produced by said projection lens are positioned properly on said screen.

8. The combination with a fixed screen, of a projector including a projection lens adapted to be disposed in a fixed position with respect to said screen, a printing device adapted to print data in line form transversely of a web movable across the projection field of said projector, means positioned at the side of said projection field toward which the web travels for drawing said web through said projection field, a rotatable support for said means and said printing device, said rotatable support normally positioning said printing device in predetermined operative position with respect to said projector, and means for movably mounting said rotatable support whereby said printing device may be moved from and toward said predetermined position.

9. An optical projector for a traveling sheet of printed matter, said projector comprising a housing, a light source within said housing, a projector lens and chamber therefor carried by said housing, and a conduit connected to said chamber for passing cooling air through said chamber and housing.

EDWARD H. UNKLES.